US00RE40824E

(19) United States
(12) Reissued Patent
Czaja et al.

(10) Patent Number: US RE40,824 E
(45) Date of Reissued Patent: Jul. 7, 2009

(54) MOBILE STATION HANDOFF BETWEEN DIFFERENT CDMA FREQUENCIES

(76) Inventors: Stash Czaja, 806 Ocean Crest, Cardiff, CA (US) 92007; Sakari Jorri, Koulutie 8, 25130 Muurla (FI); Iikka Niva, 13127 Scabard Pl., San Diego, CA (US) 92128

(21) Appl. No.: 10/957,522
(22) Filed: Oct. 1, 2004
(Under 37 CFR 1.47)

Related U.S. Patent Documents

Reissue of:
(64) Patent No.: 6,459,689
Issued: Oct. 1, 2002
Appl. No.: 09/464,033
Filed: Dec. 15, 1999

U.S. Applications:
(63) Continuation of application No. 08/915,998, filed on Aug. 21, 1997, now Pat. No. 6,078,570.

(51) Int. Cl.
*H04Q 7/00* (2006.01)
*H04B 7/216* (2006.01)

(52) U.S. Cl. ..... 370/331; 370/335; 370/342; 455/436

(58) Field of Classification Search ..... 370/310, 370/319, 332, 341, 344, 349, 331, 328, 330, 370/281, 296, 335, 342; 455/436, 439, 442, 455/434, 33.1, 33.2
See application file for complete search history.

(56) References Cited

U.S. PATENT DOCUMENTS 5,649,000 A * 7/1997 Lee et al. ..... 455/436
5,778,316 A * 7/1998 Persson et al. ..... 455/434
5,848,063 A * 12/1998 Weaver et al. ..... 370/331
6,078,570 A * 6/2000 Czaja et al. ..... 370/331

* cited by examiner

*Primary Examiner*—Brenda Pham
(74) *Attorney, Agent, or Firm*—Connolly Bove Lodge & Hutz LLP

(57) ABSTRACT

A method and system for mobile assisted handoff between base stations using different carrier frequencies in a Code Division Multiple Access (CDMA) cellular system. In the method and apparatus, a mobile station performs handoff measurements on forward link transmissions of handoff candidate CDMA base stations, where the forward link transmissions are transmitted on a carrier frequency that differs from the forward link carrier frequency of the current base station. The handoff measurements are performed during selected transmission frames that define transmission periods on the reverse link by the mobile station. During the measurement time in the selected transmission frame, the mobile station does not receive (punctures) data sent to it on the forward link and does not transmit data on the reverse link.

18 Claims, 4 Drawing Sheets

FIG. 5A

| Field | Length (bits) |
|---|---|
| MSG_TYPE ('00010101') | 8 |
| ACQ_SEQ | 3 |
| MSG_SEQ | 3 |
| ACQ_REC | 1 |
| ENCRYPTION | 2 |
| PILOT_INC | 4 |
| CDMA_FREQ | 11 |
| USE_TIME | 1 |
| ACTION_TIME | 6 |
| AVER_SRCH_PRIOD | 5 |
| SRCH_DISABLE | 1 |

One or more occurence of the following record:

| | |
|---|---|
| NGHBR_PN | 9 |
| SRCH_WIN | 6 |

| | |
|---|---|
| RESERVED | 0-7 (as needed) |

FIG. 5B

| Field | Length (bits) |
|---|---|
| MSG_TYPE ('00010110') | 8 |
| ACQ_SEQ | 3 |
| MSG_SEQ | 3 |
| ACQ_REC | 1 |
| ENCRYPTION | 2 |
| CDMA_FREQ | 11 |
| NO_SUPPORT | 1 |
| REF_PIN | 9 |
| PILOT_STRENGTH | 6 |
| CDMA_SIG_STRENGTH | 6 |
| KEEP | 1 |

Zero or more occurence of the following record:

| | |
|---|---|
| PILOT_PN_PHASE | 15 |
| PILOT_STRENGTH | 6 |
| KEEP | 1 |

| | |
|---|---|
| RESERVED | 0-7 (as needed) |

MOBILE STATION HANDOFF BETWEEN DIFFERENT CDMA FREQUENCIES

Matter enclosed in heavy brackets [ ] appears in the original patent but forms no part of this reissue specification; matter printed in italics indicates the additions made by reissue.

This application is a continuation of U.S. application Ser. No. 08/915,998, filed Aug. 21, 1997 now U.S. Pat. No. 6,078,570.

FIELD OF THE INVENTION

The present invention relates to handoff techniques in cellular telecommunication systems, and, more particularly, to a method and apparatus for mobile assisted handoff between different frequencies in a Code Division Multiple Access (CDMA) cellular system.

BACKGROUND OF THE INVENTION

Each base station in a cellular system provides a radio interface to mobile stations within a particular area or zone of the system generally referred to as a cell. Each base station is in communication with a mobile switching center which may switch calls from one base station to another base station and connects the base station with the local phone system over landlines or connects the base station with another cellular telephone system. One of the most critical functions associated with mobile telephone use in a cellular system is the transfer of calls from one base station to another as the user travels from one cell to an adjoining cell. This transfer of call control is commonly known as handoff.

As the mobile telephone moves through a cell, the strength of its transmitted signal will vary depending on its distance from the base station. The base station's range within its cell is designed to drop off rapidly as the coverage range of its cell is reached. If a mobile telephone leaves a cell during ongoing communication and moves into a different cell, it is necessary that a new base station be selected without any disturbance to the communication. In early analog systems, the current base station monitored the strength of the signal emanating from the mobile telephone. As the signal strength lowered to critical levels, a search was conducted of neighboring base stations to determine which base station was receiving the strongest signal from the moving mobile telephone. The switching center would then instruct the mobile telephone through the current base station to change to the necessary parameters of the new base station and handoff occurred.

In more recent Time Division Multiple Access (TDMA) systems where users are each assigned unique time slots on a frequency channel, the mobile stations are designed to measure the strength of certain signals transmitted by surrounding base stations during timeslots when communications are inactive and transmit this information back through the base station to the switching center. This provides the switching center with the information necessary to decide when and to what base station a particular mobile telephone must be switched in order to maintain communication. This technique is called Mobile Assisted Handoff (MAHO).

The most recent type of cellular technology to be developed is Code Division Multiple Access (CDMA). In a CDMA type system multiple users, each using a channel identified by a uniquely assigned digital code, simultaneously communicate with the system while sharing the same wideband frequency spectrum. A CDMA system may be designed so that all base stations share the entire downlink frequency spectrum and all mobile stations share the entire uplink frequency spectrum. In a CDMA system, then, handoff may be necessary between base stations using the same frequencies. This is known as "soft handoff". In soft handoff a mobile station in transition from one base station to another transmits and receives the same signal from both base stations simultaneously. In a CDMA receiver a rake receiver can be used to isolate the signals received at the mobile station from each base station and align them both in time and phase to reinforce one another on the base-to-mobile link. On the reverse link a mobile switching center connected to both base stations resolves which base station is receiving the stronger signal and selects the signal from that base station for the call.

In a CDMA system soft handoff may not always be possible. In these cases hard handoff is used. Hard handoff is handoff in which a temporary disconnection of the communication path (i.e., traffic channel) between a mobile station and a base station takes place. Hard handoffs occur when the mobile station is transferred between disjoint active sets, the CDMA frequency assignment changes, the frame offset changes, or the mobile station is directed from a CDMA traffic channel to an analog voice channel. Hard handoff is distinct from soft handoff wherein communications with a new base station is commenced on the same CDMA frequency assignment before the communications with the old base station are terminated. Hard handoff presents some difficulties in CDMA systems. In general, in a CDMA system a user is assigned all data transmission frames at a CDMA traffic channel sequentially in time. In mobile assisted hard handoff, since the frequencies differ between the systems involved, it would be necessary to use a separate receiver to make handoff measurements at the mobile station, if the mobile assisted handoff were to be noninterfering with ongoing communications.

SUMMARY OF THE INVENTION

An object of the present invention is to provide a Code Division Multiple Access (CDMA) cellular system that permits Mobile Assisted Handoff (MAHO) between CDMA base stations that use different carrier frequencies by performing periodic searches of the different carrier frequency base station pilots.

Another object of the present invention is to provide a mobile CDMA cellular system wherein the mobile telephone searches for the base stations on a different carrier frequency without significant degradation in system performance.

The present invention provides a method and system for mobile assisted hard handoff (MAHHO) between base stations using different carrier frequencies in a Code Division Multiple Access (CDMA) cellular system. In the method and apparatus, a mobile station performs periodic handoff measurements on forward link transmissions of handoff candidate CDMA base stations, where the forward link transmissions are transmitted on a carrier frequency that differs from the forward link carrier frequency of the current base station. The handoff measurements are performed during selected transmission frames that define transmission periods on the reverse link by the mobile station. During the measurement time in the selected transmission frame, the mobile station does not receive (puncture) data sent to it on the forward link and does not transmit data on the reverse link.

In an embodiment of the invention, transmission frames including data that are being transmitted at a selected reduced rate are used as the selected transmission frames for mobile station handoff measurements. The position of the measurement periods within the selected transmission frames may be chosen to minimize the amount of data that is not transmitted and lost on the reverse link during the measurement period. The position of the measurement period may also be chosen so that disturbance of other functions of the system, such as, for example, mobile station power control from a base station, is minimized. During the measurement periods the mobile station punctures the received data stream that is transmitted to the mobile station on the forward link.

The handoff measurements may occur periodically. In one alternative that may be used for variable data rate transmissions, such as a voice call using a variable rate coder, a periodically expiring timer causes the next transmission frame that includes data at the selected reduced rate, subsequent to the timer's expiration, to be chosen as the transmission frame for handoff measurements. In another alternative that may be used for data transmissions having a data role settable independent of the application, the data transmission rate is periodically forced to a selected reduced rate in both the base station and mobile station, and the handoff measurements are periodically performed during the transmission frames that include the data at the selected reduced rate.

In an alternative embodiment of the invention, the selected transmission frames for mobile-station handoff measurements may be chosen periodically but without regard for the data rate of the selected transmission frame. In this embodiment the handoff measurements are performed during the selected transmission frames on the reverse link with no attempt to optimize the position of the measurement period within the selected transmission frame. Data to be transmitted on the reverse link during the selected transmission frame is not transmitted and lost. In this embodiment the mobile station punctures the received data stream that is transmitted to the mobile station on the forward link.

BRIEF DESCRIPTION OF THE DRAWINGS

Other and further features, advantages and benefits of the invention will become apparent in the following description taken in conjunction with the following drawings. It is to be understood that the foregoing general description and the following detailed description are exemplary and explanatory but are not to be restrictive of the invention. The accompanying drawings, which are incorporated in and constitute a part of this invention, together with the description, serve to explain the principles of the invention in general terms. Like numerals refer to like parts throughout the disclosure.

FIGS. 5A and 5B illustrate configurations for a MAHHO Neighbor List Message (MNLM) and a MAHHO Pilot Strength Measurement (MPSM) Message.

DESCRIPTION OF THE PREFERRED EMBODIMENT

Figure 1:
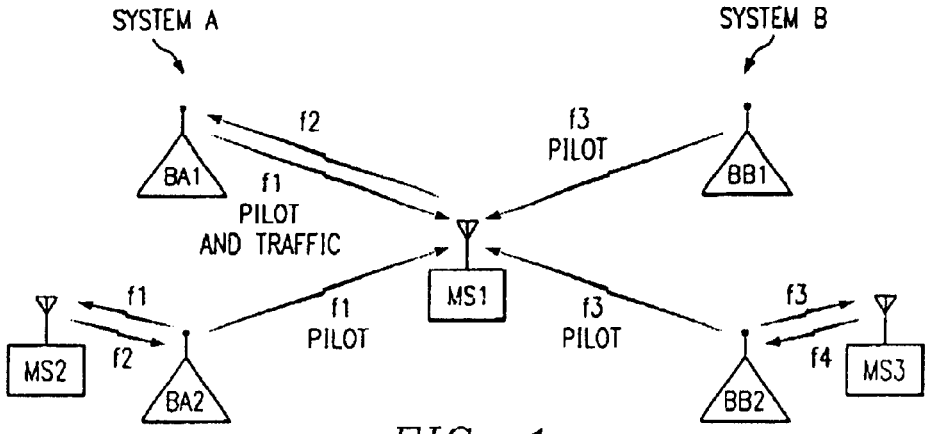
FIG. 1 is a block diagram illustrating an inter-frequency handoff scenario in a CDMA cellular system.

Referring now to FIG. 1, therein is a block diagram illustrating an inter-frequency handoff scenario in a CDMA Cellular Network. System A comprises base stations BA1 and BA2 and System B comprises base stations BB1 and BB2. Mobile station MS1, MS2 and MS3 are capable of operation in either System A or System B. System A uses carrier frequency $f_1$ for base-to-mobile (forward) link and frequency $f_2$ for mobile-to-base (reverse) link communications with mobile stations, such as MS1 and MS2 operating within system A. System B uses carrier frequency $f_3$ for forward link and carrier frequency $f_4$ for reverse link communications, with mobile stations such as MS3, operating within system B. In FIG. 1, MS1 is located near the coverage boundary between System A and System B. MS1 is engaged in communications with base station BA1 on traffic channels of forward link $f_1$ and reverse link $f_2$ of System A. At the same time the signal strength of signals received on the forward link $f_3$ of System B has become strong enough to be received at MS1. In the method and apparatus of the invention, the pilot channels of base stations of System B that are transmitted on the forward link f3, are measured by MS1 as MS1 is simultaneously engaged in communications with System A on forward link $f_1$ and reverse link $f_2$. In the embodiment of the invention, cellular Systems A and B and mobile stations MS1, MS2 and MS3 may operate according to the Telecommunications Industry Association (TIA/EIA) IS-95A or ANSI-008 Standard for CDMA systems. An exception is that the necessary signaling modifications are made to the air interface to allow the mobile assisted hard handoff of the invention.

Figure 2:
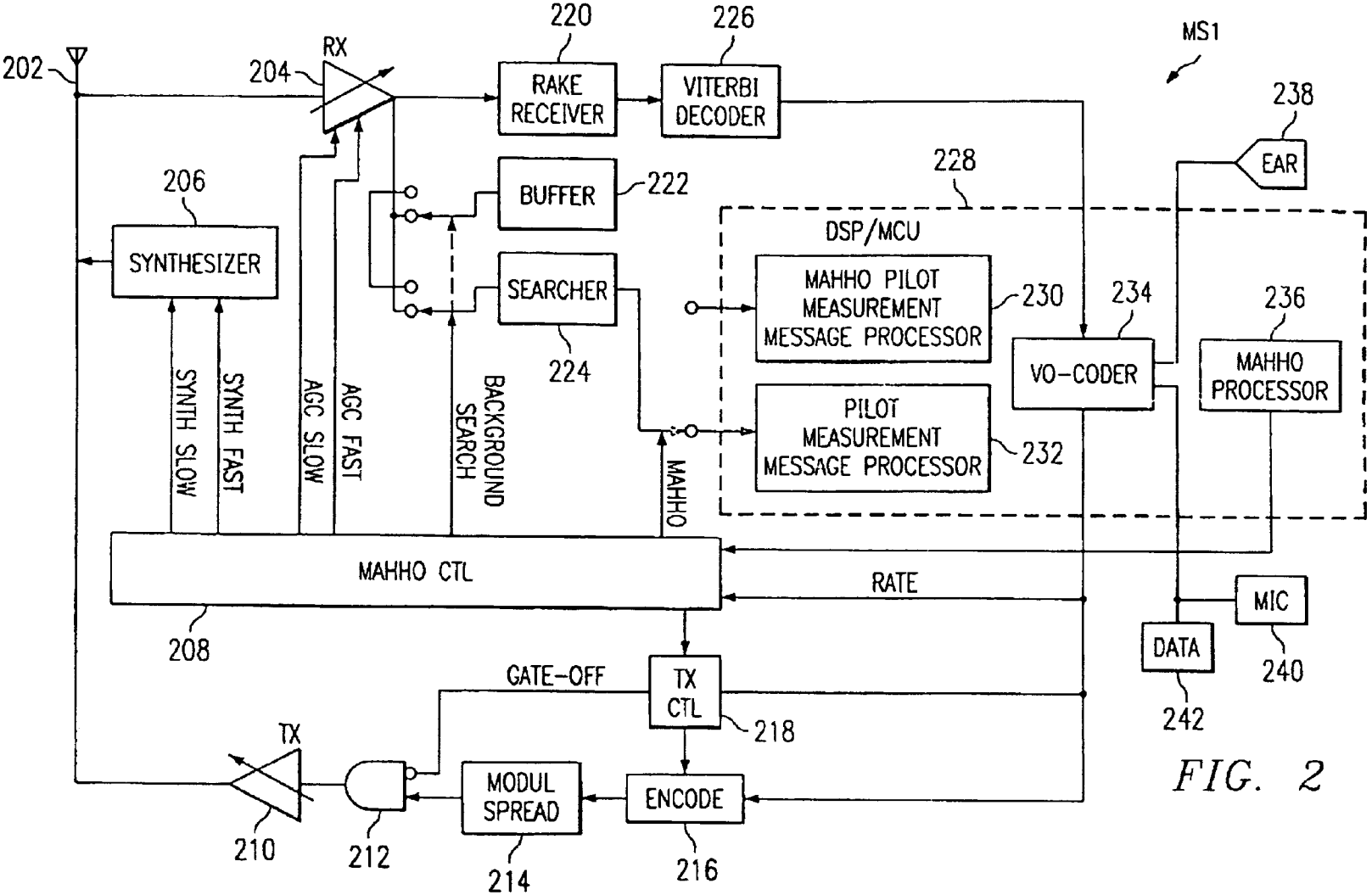
FIG. 2 is a block diagram showing portions of a CDMA mobile station according to an embodiment of the invention.

Referring now to FIG. 2, therein is a functional block diagram showing portions of a CDMA mobile station MS1 according to an embodiment of the invention. MS1 comprises antennas 202, RF receiver (RX) 204, rake receiver 220, Buffer 222, Searcher 224, Viterbi decoder 226, digital signal processing/microprocessor (DSP/MCU) 228, earpiece (EAR) 238, microphone (MIC) 240, transmit control (TXCTL) 218, encoder (ENCODE) 216, modulator/spreader (MODUL/SPREAD) 214, gating control 212, RF transmitter (TX) 210, synthesizer 206 and mobile assisted hard handoff control (MAHHO CTL) 208. DSP/MCU 228 includes MAHHO processor 236, vo-coder 234, MAHHO pilot measurement message processor 230, and pilot measurement message processor 232.

Signals received at antenna 202 are converted to an IF frequency, filtered and digitized by RX 204 and then input to rake receiver 220. Synthesizer 206 has a fast and a slow mode. MAHHO CTL 208 controls selection of fast and slow mode through signals SYNTH FAST and SYNTH SLOW. In an IS-95 embodiment where synthesizer 206 must be compatible with narrow-band AMPS, synthesizer 206 may operate with three center loops, each having a different loop gain. In the CDMA mode synthesizer 206 operates in either fast or slow (normal) mode. In order to implement the embodiment of the invention where MAHHO measurements are made within selected transmission frames on the reverse link, synthesizer 206 will settle to within 300 kHz of the frequency in less than 1 ms when in the fast mode. RX 204 has a fast automatic gain control mode and a slow (normal) automatic gain control mode. MAHHO CTL 208 controls the selection of fast or slow automatic gain control through signals, AGC fast and ACG slow. In the fast mode the automatic gain control has a step size of 2 dB and a threshold at 0.25 dB. This allows the automatic gain control to settle to the signal step change of ±/40 dB, within 1 ms. The slow modes for synthesizer 206 and RX 204 automatic gain control may be normally used for IS-95 mobile stations. The digitized IF signal input to rake receiver 220 may include signals from many ongoing calls together with pilot carriers transmitted by the base station with which the mobile station is currently communicating, plus pilot carriers transmitted by neighboring base stations. The signals that are received simultaneously must all be transmitted at the same forward link carrier frequency. Rake receiver 220 performs correlation on the IF signal with a PN sequence of a desired received signal. Searcher 224 scans the time domain around the nominal time of a received pilot signal of a base station for other multi-path pilot signals from the same base station and for other signals transmitted from different base stations. Searcher 224 measures the strength of these other signals at times other than the nominal time. Searcher 224 generates signals to MAHHO pilot processor 230 and pilot processor 232 indicating the strengths of the measured signals. The output of rake receiver is input to Viterbi decoder 226. The encoded data signals are aligned and combined and the resultant data signal is then decoded using error correction and input to vo-coder 234. Vo-coder 234 then outputs information signals to earpiece 238.

For transmission of signals from mobile station MS1, a signal received at microphone 240 or data input 242 is input to vo-coder 234 in digital form, as, for example, fax data received at data input 242, or as voice that has been received at microphone 240 and digitized. In vo-coder 234 the signal is processed and output to encoder 216. Encoder 216 Walsh encodes the signal. From encoder 216 the Walsh encoded signal is fed to module spreader 214 where it is modulated and spread onto the PN carrier sequence or the CDMA reverse link system channel to which MS1 is assigned. The modulated signal is input to TX 210 for transmission from antenna 202.

MAHHO processor 236 of DSP/MCU processor 228 provides control signals to MAHHO CTL 208 from DSP/MCU 228. MAHHO CTL 208 controls synthesizer 206, RX 204, buffer 222 and searcher 224 during MAHHO. TXCTL 218 provides a control signal to gating control 212 during MAHHO.

Figure 3:
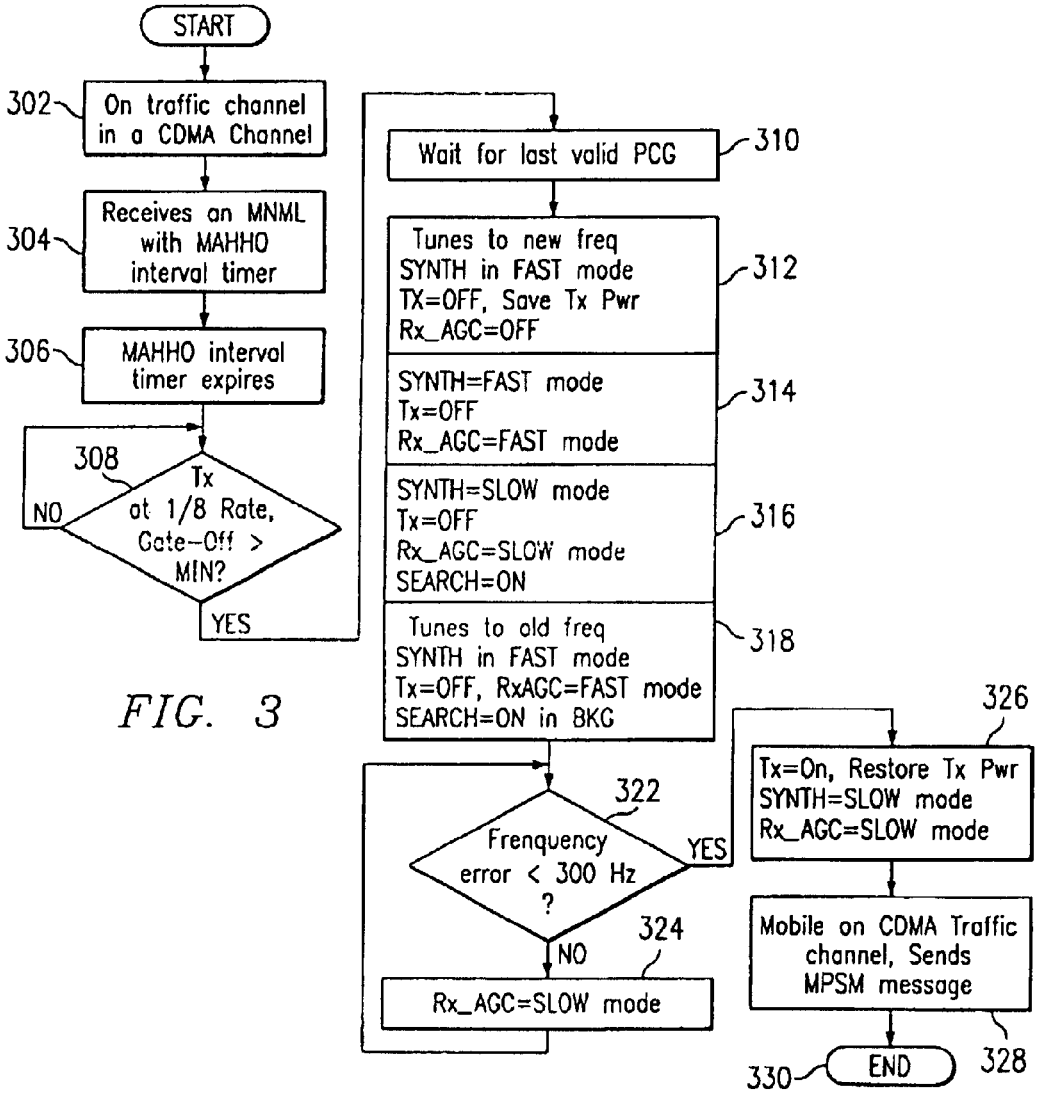
FIG. 3 is a flow diagram illustrating handoff measurement process steps according to an embodiment of the invention.

Referring now to FIG. 3, therein is shown a flow diagram illustrating the handoff measurement process steps according to the embodiment of the invention. The process shown in FIG. 3 is described with reference to FIG. 1 and an example of MAHHO for mobile station MS1 handing off from Base Station BA1 to base station BB1. The process begins at step 302 in FIG. 3 as mobile station MS1 communicates with base station BA1 on forward link $f_1$ and reverse link $f_2$ traffic channels of System A. At step 304 mobile station MS1 receives a MAHHO Neighbor List Message (MNLM) with MAHHO interval timer information from base station BA1 on the traffic channel. The MNLM message is transmitted by BA1, when a mobile station is operating in the coverage area of base station BA1 because the coverage area of base station BA1 borders System B which uses different frequencies. FIG. 5A illustrates a possible configuration for the MNLM message. Message type (MSG_TYPE) field indicates that the message is an MNLM message Acknowledgement Sequence (ACK_SEQ) field. The sequence number is set by the base station to the message sequence (MSG_SEQ) of the most recently received reverse traffic channel message. The MSG_SEQ of this MNLM message is set by the base station to the message sequence number for this message. Acknowledgment required (ACK_REQ) field indicates whether an acknowledgment is required for this message. The ENCRYPTION field is set to the current message encryption mode. The pilot increment (PILOT_INC) field indicates the pilot PN sequence offset index increment. The mobile station searches for remaining, set pilots at pilot PN sequence offset index values that are multiples of this value. CDMA frequency (CDMA_FREQ) field indicates the frequency assignment for the MAHHO measurement. The use time (USE_TIME) indicator field indicates whether an action time (ACTION_TIME) is specified for a data call. If the USE_TIME field indicates an ACTION_TIME is specified, the ACTION_TIME field is set to the system time, in units of 80 ms (module 64), at which the frequency specified in the CDMA_FREQ will be searched to set the MAHHO internal timer. The average search period (AVER-SRCH_PRIOD) field specifies the average period at which the mobile station will perform the search of the frequencies for MAHHO when on a voice call. The search disable (SRCH_DISABLE) field indicates whether a search of the MAHHO CDMA_FREQ is disabled or that the mobile station is permitted a periodic search when on a voice call. The (SRCH_WIN) fields are used to indicate the PN offset and search window to be used for each neighbor pilot of the CDMA_FREQ neighbor set specified in the MNLM message channel to be searched. NGHBR_PN and SRCH_WIN are repeated as necessary.

The MNLM message is processed by DSP/MCU 228. DSP/MCU 228 stores necessary information in memory, and configures MAHHO CTL 208 to implement MAHHO according to the MNLM message. The MAHHO interval timer is set to the value indicated in the MNLM message appropriate for the situation. If MS1 is involved in a voice call as in FIG. 3, and an AVER_SRCH_PRIOD has been specified along with SRCH_DISABLE set to indicate that a periodic search is allowed, the MAHHO interval timer is set to the value specified AVER_SRCH_PRIOD. If MS1 is alternatively involved in a data call, and USE_TIME is enabled, the MAHHO interval timer would be set to the value specified in ACTION_TIME. Throughout steps 302 and 304 MS1 has remained on the call.

Figure 4:
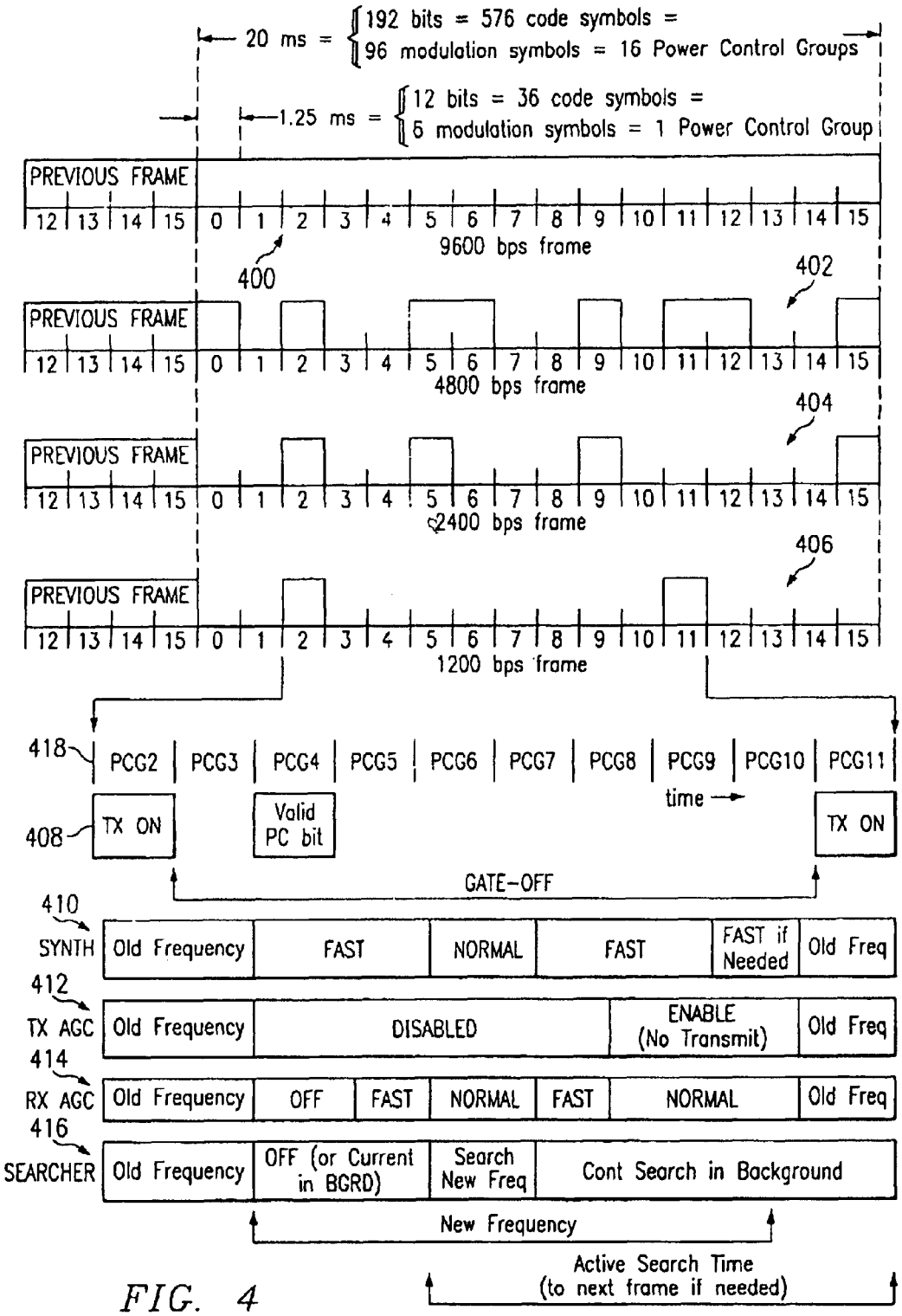
FIG. 4 is a timing diagram illustrating reverse link transmission and handoff measurement timing according to an embodiment of the invention.

Referring now to FIG. 4, therein is shown a timing diagram illustrating reverse link transmission and handoff measurement timing according to the embodiment of the invention. FIG. 4 shows an example of transmission frame timing in sequences 400, 402, 404 and 406, for full rate (9600 bps), half rate (4800 bps), quarter rate (2400 bps) and eighth rate (1200 bps), respectively. FIG. 4 also shows MAHHO timing in sequences 408, 410, 412, 414 and 416, for the TX 210, synthesizer 206, TX 210 automatic gain control, RX 204 automatic gain control and searcher 224, respectively. While MS1 is on the call each data frame output from variable rate vo-coder 234 is at one of full, half, one-quarter or one-eighth data rates as shown in sequences 400–406.

Next, at step 306, the MAHHO interval timer expires. At step 308, in response to the MAHHO interval timer expiring MAHHO CTL 208 monitors transmission frames output from vo-coder 234. When it is determined that the first ⅛ transmission frame has been output by vo-coder 234, the gate-off period of the transmission frame is checked to determine the maximum amount of time that is available for performing the MAHHO measurements during the transmission frame.

If a determination is made at method step 308 that the gate-off period is greater than gate-off min, the process moves to step 310. If, however, a determination is made that the gate-off period is not greater than gate-off min, the process returns to step 308 and waits for the next ⅛ rate transmission frame to be output from vo-coder 234. Step 308 is performed once or is repeated until the first transmission frame having ⅛ data rate and a gate-off period greater than gate-off min is found, and then the process moves to step 310. Alternatively, if MS1 is involved in a data call, the step at 308 may be replaced with a step in which DSP/MCU 228 forces the output of Vo-coder 234 to ⅛ rate with the appropriate gate-off period. Once the data rate has been forced to ⅛ rate, the process then moves to step 310. At step 310, MAHHO CTL 208 waits for the last valid power control group to be transmitted in the ⅛ rate transmission frame from BA1. In FIG. 4 step 310 occurs two PCGs after PCG2 of sequence 418, i.e., the first occurrence of data transmission in transmission frame 406. The process now moves to step 312. Step 312 occurs during PCG5 of FIG. 4. In step 312, at the beginning of PCG5, synthesizer 206 is set to fast mode, TX 210 is gated off, the automatic gain control of RX 204 is tuned off, and searcher 224 is either off, or alternatively, searching the current frequencies (System A frequencies) in the background. The automatic gain control of TX 210 is disabled and the current TX 210 closed loop value is stored. Next, the process moves to step 314. Step 314 occurs at the beginning of PCG6 where the automatic gain control of RX 204 is set to the fast mode to allow the automatic gain control to track an input signal step change of more than 40 dB. The automatic gain control open loop estimate of RX204 is also stored.

The process now moves to step 316. Step 316 occurs during PCG7 at FIG. 4. In step 316, at the beginning of PCG7, the automatic gain control of RX 204 is set to slow mode, and synthesizer 206 is set to slow mode, and searcher 224 begins loading buffer 222 with new frequency samples and starts searching the PN pilots in the new frequency band.

Next the process moves to step 318. Step 318 occurs during PCG8 of FIG. 4. At the beginning of PCG8, synthesizer 206 is set to fast mode to allow RX 204 to tune to the frequency band of System A and the automatic gain control of RX 204 is set to the fast mode to allow RX 204 to track the input step change. The automatic gain control open loop estimate of RX 204 stored in Step 314 is restored at this point. Searcher 224 continues the search of the new frequency band in the background from data stored in buffer 222.

Next, the process moves to step 322. Step 322 occurs during PCG9 of FIG. 4. At the beginning of PCG9, the frequency error is checked to determine whether synthesizer 206 is settled to within a predetermined range of the frequency f, of System A. If synthesizer 206 has settled to within the predetermined range, the process moves to step 326. If, however, it is determined at step 322 that synthesizer 206 has not settled to within the predetermined range, the process moves to step 324. At step 324 the automatic gain control of RX 204 is set to the slow mode. The process then waits one PCG and then moves back to step 322. At step 322 a determination is again made as to whether synthesizer 206 has settled to within the predetermined frequency range. The process will repeat step 324 and 322 as many times as necessary for the synthesizer frequency error to settle.

In the example of FIG. 4, one iteration of step 324 is done in PCG10. When the synthesizer settles, the process moves to step 326. Step 326 occurs during PCG 11 in FIG. 4. At the beginning of PCG 12, TX 210 is gated on, power is restored to TX 210, synthesizer 206 is switched to slow mode, and the automatic gain control of RX 204 is set to slow mode if it is not already set to slow mode. TX 210 automatic gain control is restored and added to the last valid TX level. MS1 may then restore open and closed loop transmit power without incurring any TX power error.

The second portion of the data transmission during the transmission from MS1 now occurs in PCG11. The process now moves to step 328. At step 328, MS1 transmits the MAHHO pilot strength measurement message (MPSM) to base station BA1. FIG. 5B illustrates a possible configuration for the MPSM message. The message type (MSG_TYPE) field indicates that the message is an MPSM message. Acknowledgement sequence (ACK_SEQ) field is set by the mobile station to the (MSG_SEQ) field of the most recently received formal traffic channel message requiring acknowledgment. The message sequence (MSG_SEQ) field is set by the mobile station to the message sequence number for this field. The acknowledgment required (ACK_REQ) field indicates whether an acknowledgment is required for this message. The encryption field is set to the current message encryption mode. The CDMA frequency (CDMA_FREQ) field indicates the frequency assignments for which the MAHHO measurements were performed. The no support (NO_SUPPORT) field is used to indicate that the mobile station does not support MAHHO. The reference PN (REF_PN) field is set to the PN sequence offset of the pilot used by the mobile station to derive its time reference, relative to the zero offset pilot PN sequence. The pilot strength (PILOT_STRENGTH) field is set to indicate the strength of the pilot used by the mobile station to derive its time reference. CDMA signal strength (CDMA_SIG_STRG) is set to indicate the CDMA signal strength on the new frequency in dBm relative to the received signal strength of the current CDMA frequency. KEEP indicates whether the handoff drop timer corresponding to the pilot used by the mobile to derive its time reference has expired. The pilot PN phase (PILOT_PN_PHASE) and pilot strength (PILOT_STRENGTH) fields are used to indicate the pilot measured phase and pilot strength of each measured pilot. PILOT_PN_PHASE and PILOT_STRENGTH are repeated, as necessary, for each pilot measured.

In an alternative embodiment, the MAHHO process may be done periodically upon the expiration of the MAHHO interval timer, without waiting for a ⅛ rate transmission frame in which to make the MAHHO measurements. After the MAHHO interval timer expires similarly to Step 306. In this embodiment TX 210 is gated off they next reverse link transmission frame, or a number of frames while MAHHO measurements are made. Forward link transmissions are also punctured during this measurement period. This embodiment may be more suited to mobile stations constructed similarly to MS1 at FIG. 2 that lack RX 204's automatic gain control fast mode (AGC FAST) and synthesizer 206's fast mode (SYNTH FAST) and that would not be able to perform measurements fast enough to utilize the gate-off period of a transmission frame as described for the previous embodiment. During the measurement period synthesizer 206 tunes to the search frequency. TX 210 is disabled, RX 204 receives the search frequency with normal automatic gain control, and searcher 224 searches the new frequency once RX 204 and synthesizer 206 have settled. When the measurements are completed RX 204 and synthesizer 206 return to the current frequency and TX 210 is enabled. Searcher 224 may continue searching in the background. Data lost on both the forward and reverse link during the measurement period may be recovered by normal methods.

What has been described is a method and apparatus for mobile assisted handoff between different frequencies in a Code Division Multiple Access (CDMA) mobile cellular telephone system wherein the mobile telephone searches for the base stations on a different carrier frequency without significant degradation in system performance.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined in the appended claims.

What is claimed is:

1. A method for handoff of a mobile station from a first base station to a second base station in a telecommunications system, *and wherein a plurality of transmission frames are transmitted from the first base station to the mobile station on a first frequency,* said method comprising the steps of:

[transmitting a plurality of transmission frames from the first base station to the mobile station on a first frequency;]

receiving a first at least one [data] *transmission* frame of said plurality of transmission frames at the mobile station; and performing measurements on transmissions *received* from the second base station on a second frequency, wherein said measurements are performed during a time period, said time period including a time when a second at least one transmission frame of said plurality of transmission frames is transmitted to the mobile station and at least a portion of said second at least one transmission frame of said plurality of transmission frames is punctured and not received at the mobile station.

2. The method of claim 1, wherein said plurality of transmission frames comprises a first plurality of transmission frames, and wherein said method further comprises [the step of] generating a second plurality of transmission frames at the mobile station, said second plurality of transmission frames for transmission to the *first* base station, and wherein said time period during which said measurements are performed in said [step of] performing further includes a time when at least one transmission frame of said second plurality of transmission frames is to be transmitted from the mobile station to the first base station, and at least a portion of said at least one transmission frame of said second plurality of transmission frames is punctured and not transmitted from the mobile station to the first base station.

3. The method of claim 2, wherein said measurements performed in said [step of] performing are performed according to timing information transmitted to the mobile station from the telecommunications system.

4. The method of claim 2, wherein said method further includes [the step of] selecting said time period during which said measurements are performed based on the data rate of said at least one transmission frame of said second plurality of transmission frames.

5. The method of claim 4, wherein said time period is selected based on a determination that the data rate of said at least one transmission frame of said second plurality of transmission frames is less than a predetermined data rate.

6. A method for handoff of a mobile station from a first base station to a second base station in a telecommunications system, said method comprising [the steps of]:

generating a plurality of transmission frames in the mobile station, said plurality of transmission frames for transmission to the first base station on a first frequency;

determining a selected at least one transmission frame from said plurality of transmission frames; and performing measurements on a transmission from said second base station on a second frequency during a time period when at least a portion of said selected at least one transmission frame is to be transmitted to the first base station, wherein said at least a portion of said selected at least one transmission frame is punctured and not transmitted to the first base station.

7. The method of claim 6, wherein said [step of] determining a selected at least one transmission frame comprises determining a selected at least one transmission frame having a data rate less than a predetermined data rate.

8. The method of claim 6, wherein said [step of selecting is performed] *determining further includes determining said selected at least one transmission frame* according to timing information transmitted to the mobile station from the telecommunications system.

9. A system for performing Mobile Assisted Hard Handoff (MAHHO) comprising:

a first base station comprising a transmitter for transmitting a plurality of transmission frames on a first frequency;

a second base station comprising a transmitter for transmitting transmissions on a second frequency;

a mobile station, including a receiver for receiving a first at least one transmission frame of said plurality of transmission frames from said first base station, said mobile station further including a MAHHO apparatus for performing measurements on said transmissions from said second base station, wherein said measurements are performed during a time period, said time period including a time when a second at least one transmission frame of said plurality of data frames is transmitted from said first base station to said mobile station, and at least a portion of said second at least one transmission frame of said plurality of data frames is punctured and not received at said mobile station.

10. The system of claim 9, wherein said plurality of transmission frames comprises a first plurality of transmission frames and said mobile station further comprises a processor for generating a second plurality of transmission frames, said second plurality of transmission frames for transmission to the base station, and wherein said time period during which said MAHHO apparatus performs said measurements on said transmissions from the second base station further includes a time when at least one transmission frame of said second plurality of transmission frames is to be transmitted from the mobile station to the first base station, and at least a portion of said at least one transmission frame of said second plurality of transmission frames is punctured and not transmitted from the mobile station to the first base station.

11. The system of claim 10, wherein said *MAHHO apparatus performs said* measurements [performed in said step of performing are performed] according to timing information transmitted to the mobile station from the first base station.

12. The system of claim 10, wherein said MAHHO apparatus selects said time period during which said measurements are performed based on the data rate of said at least one transmission frame of said second plurality of transmission frames.

13. A mobile station for providing handoff from a first base station to a second base station, said mobile station comprising:

a processor for generating a plurality of transmission frames, said plurality of transmission frames for transmission to the first base station on a first frequency; *and* a MAHHO apparatus for selecting at least one transmission frame from said plurality of transmission frames, and performing measurements on a transmission from said second base station on a second frequency during a time period when at least a portion of said at least one transmission frame is to be transmitted to the first base station, wherein said at least a portion of said at least one transmission frame is punctured and not transmitted to the first base station.

14. The [apparatus] *mobile station* of claim 13, wherein said MAHHO apparatus selects said at least one transmission frame based on the data rate of said at least one transmission frame.

15. The [apparatus] *mobile station* of claim 14, wherein said MAHHO apparatus selects said at least one transmission frame based on a determination that the data rate of said at least one transmission frame is less than a predetermined rate.

16. The [apparatus] *mobile station* of claim 13, wherein said MAHHO apparatus performs said measurements according to timing information transmitted to the mobile station from the first base station.

*17. A method for handoff of a mobile station from a first frequency over which a plurality of transmission frames are transmitted to said mobile station in a communications system, said method comprising:*

*receiving at least one transmission frame of a plurality of transmission frames at said mobile station on said first frequency; and*

*performing measurements on transmissions received on a second frequency, wherein said measurements are performed during a time period, said time period including a time when at least a portion of a second transmission frame of said plurality of transmission frames is punctured at said mobile station.*

*18. A device comprising:*

*a receiver to receive on a first frequency a first at least one transmission frame of a plurality of transmission frames; and*

*an apparatus to perform measurements on transmissions on a second frequency from a second base station, wherein said measurements are performed during a time period, said time period including a time when a second at least one transmission frame of said plurality of transmission frames is transmitted, and at least a portion of said second at least one transmission frame of said plurality of transmission frames is punctured at said device.*

* * * * *